United States Patent
Muraki et al.

(10) Patent No.: US 10,196,093 B2
(45) Date of Patent: Feb. 5, 2019

(54) VEHICLE FRONT PORTION STRUCTURE

(71) Applicant: TOYOTA JIDOSHA KABUSHIKI KAISHA, Toyota-shi, Aichi-ken (JP)

(72) Inventors: Tomohito Muraki, Nisshin (JP); Kenichi Yamashita, Toyota (JP); Takahiro Hashimitsu, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/835,593

(22) Filed: Dec. 8, 2017

(65) Prior Publication Data

US 2018/0170446 A1     Jun. 21, 2018

(30) Foreign Application Priority Data

Dec. 19, 2016   (JP) .................................. 2016-245814

(51) Int. Cl.
    *B62D 25/08*    (2006.01)
    *B60R 13/07*    (2006.01)
(52) U.S. Cl.
    CPC ............ *B62D 25/081* (2013.01); *B60R 13/07* (2013.01)
(58) Field of Classification Search
    CPC ............................... B62D 25/081; B60R 13/07
    USPC ......................................................... 296/192
    See application file for complete search history.

(56) References Cited

U.S. PATENT DOCUMENTS

| 2009/0146459 A1* | 6/2009 | Watanabe | B62D 25/081 296/192 |
| 2010/0201157 A1* | 8/2010 | Daab | B62D 25/081 296/192 |
| 2015/0015030 A1* | 1/2015 | Sasaki | B62D 25/081 296/192 |
| 2015/0028629 A1* | 1/2015 | Sasaki | B62D 25/081 296/192 |

FOREIGN PATENT DOCUMENTS

| DE | 102015207067 A1 * | 10/2016 | ........... B62D 25/081 |
| EP | 2594462 A1 * | 5/2013 | ........... B62D 25/081 |
| JP | 2007326385 A * | 12/2007 | |
| JP | 2016-002952 A | 1/2016 | |
| WO | WO-9640544 A1 * | 12/1996 | ........... B62D 25/081 |

* cited by examiner

*Primary Examiner* — Jason S Morrow
(74) *Attorney, Agent, or Firm* — Oliff PLC

(57) ABSTRACT

A vehicle front portion structure includes a cowl having an outside air introduction duct and a cowl louver. The cowl louver includes an outer plate portion and an inner plate portion disposed below the outer plate portion and covering the outside air introduction duct from the upper side of the vehicle. An outside rib protruding from the outer plate portion toward the inner plate portion and an inside rib protruding from the inner plate portion toward the outer plate portion are disposed in an intake space. A virtual straight line passing through an end portion of the intake space on a front side of the vehicle and an end portion of the intake space on a rear side of the vehicle intersects with at least one of the outside rib and the inside rib.

10 Claims, 3 Drawing Sheets

VEHICLE FRONT PORTION STRUCTURE

INCORPORATION BY REFERENCE

The disclosure of Japanese Patent Application No. 2016-245814 filed on Dec. 19, 2016 including the specification, drawings and abstract is incorporated herein by reference in its entirety.

BACKGROUND

1. Technical Field

The disclosure relates to a vehicle front portion structure.

2. Description of Related Art

A vehicle front portion structure suppressing water infiltration from an outside air introduction duct that is open in a cowl is known. Japanese Unexamined Patent Application Publication No. 2016-002952 (JP 2016-002952 A) discloses a vehicle front portion structure in which a projection is disposed on the bottom surface of an intake passage so that water infiltrating from a ventilation hole formed in a cowl louver splashes in the intake passage to the front of a vehicle, which is on the side opposite to an outside air introduction duct.

SUMMARY

In some cases, a high-pressure washer is used for vehicle washing. The momentum of high-pressure water sprayed from the high-pressure washer is not reduced even after its collision with a sprayed surface and the high-pressure water flows along the sprayed surface. Accordingly, in a case where the high-pressure washer is used for washing, a problem arises by the high-pressure water that flows along the surface of a cowl louver being more likely to infiltrate from a ventilation hole than rainwater and normal washing water.

Infiltration of the high-pressure water from the ventilation hole is yet to be taken into account, and thus a ventilation path of a vehicle front portion structure has room for improvement for infiltration of high-pressure water into an outside air introduction duct to be suppressed after the high-pressure water passes through a ventilation hole.

An aspect relates to a vehicle front portion structure including a cowl having an outside air introduction duct introducing air into a cabin of a vehicle and a cowl louver exposed to a top of the vehicle and covering the cowl from an upper side of the vehicle. The cowl louver has a ventilation hole communicating with an outside of the vehicle. The cowl louver includes an outer plate portion extending in a width direction of the vehicle and an inner plate portion disposed below the outer plate portion in the vehicle and covering the outside air introduction duct from the upper side of the vehicle. An intake space formed between the outer plate portion and the inner plate portion forms a part of an outside air introduction path allowing the ventilation hole and the outside air introduction duct to communicate with each other. An outside rib protruding from the outer plate portion toward the inner plate portion and extending in the width direction of the vehicle and an inside rib protruding from the inner plate portion toward the outer plate portion and extending in the width direction of the vehicle are disposed in the intake space. A virtual straight line passing through a front end portion of the intake space on a front side of the vehicle and a rear end portion of the intake space on a rear side of the vehicle intersects with at least one of the outside rib and the inside rib.

According to the aspect, the inner plate portion of the cowl louver is interposed between the ventilation hole and the outside air introduction duct. As a result, direct water flow into the outside air introduction duct is suppressed even when water infiltrates from the ventilation hole. In a case where water infiltrates into the intake space, which is a part of the outside air introduction path, the water collides with at least one of the outside rib and the inside rib. Accordingly, the momentum of the water directed toward the outside air introduction duct in the intake space can be further dampened. Accordingly, when water infiltrates from the ventilation hole, passage of the water through the intake space can be further suppressed. Eventually, the water reaching the outside air introduction duct can be further suppressed.

In the vehicle front portion structure according to the aspect, a tip of the outside rib may be spaced apart from the inner plate portion and a tip of the inside rib may be spaced apart from the outer plate portion.

In the vehicle front portion structure according to the aspect, the outside rib may include at least a first outside rib and a second outside rib disposed behind the first outside rib in the vehicle front-rear direction. The inside rib may include at least a first inside rib and a second inside rib disposed behind the first inside rib in the vehicle front-rear direction. The virtual straight line may intersect with at least two of the first outside rib, the second outside rib, the first inside rib, and the second inside rib.

In the vehicle front portion structure according to the aspect, a tip of the first inside rib may be closer to the top of the vehicle than a tip of the second outside rib and a tip of the second outside rib may be closer to a bottom of the vehicle than a tip of the first inside rib.

In the vehicle front portion structure according to the aspect, the cowl louver may be provided with a constricted portion where the intake space is constricted by the outer plate portion and the inner plate portion approaching each other and a tip of the outside rib and a tip of the inside rib may be positioned in the constricted portion.

According to the aspect, the protrusion lengths of the outside rib and the inside rib can be reduced by the constricted portion. Accordingly, rigidity can be more appropriately ensured for the cowl louver than in a case where the outside rib and the inside rib have a long protrusion length and the momentum of the water directed toward the outside air introduction duct can be dampened at the same time.

In the vehicle front portion structure according to the aspect, the inner plate may have a bulging portion which bulges from the inner plate portion bulges toward the outer plate portion, and which is disposed in the constricted portion and the outside rib may protrude from the outer plate portion toward an end portion of a top surface of the bulging portion on the front side of the vehicle.

According to the aspect, the water that flows along the outer plate portion in the intake space in the event of water infiltration into the intake space collides with the outside rib and is turned toward the inner plate portion. The water that flows along the inner plate portion in the intake space collides with the bulging portion and is turned toward the outer plate portion. Since the structure that hinders water inflow is disposed at the inlet of the constricted portion, the amount of water infiltrating into the side that is provided downstream of the constricted portion can be further reduced.

In the vehicle front portion structure according to the aspect, a plurality of the outside ribs and a plurality of the inside ribs may be disposed side by side in a front-rear direction of the vehicle and the outside ribs and the inside ribs may be alternately disposed. According to the aspect, the ribs are alternately disposed from above and below, and thus the shape of the intake space can be complex and water infiltration can be further suppressed.

In the vehicle front portion structure according to the aspect, the outside rib may extend toward a rear of the vehicle. The inside rib may extend toward a front of the vehicle. The outside rib and the inside rib may be inclined such that a part of each of the outside rib and the inside rib on a lower side of the vehicle is closer to the rear of the vehicle than a part of each of the outside rib and the inside rib on an upper side of the vehicle.

According to the aspect, water that has a momentum dampened by collisions with the outside rib and the inside rib can be held and water flow to the downstream side of the outside air introduction path can be suppressed.

In the vehicle front portion structure according to the aspect, an end edge of the inner plate portion on the rear side of the vehicle may be bent toward the upper side of the vehicle.

According to the aspect, a weir is formed at the rear end of the inner plate portion. As a result, water that has a momentum dampened by collisions with the outside rib and the inside rib can be held before the water infiltrates into the outside air introduction duct even when the water passes through the intake space after infiltrating from the ventilation hole.

In the vehicle front portion structure according to the aspect, the cowl louver may be provided with a ridge portion raised to the top of the vehicle. The ridge portion may have a front wall having a front surface oriented to a front of the vehicle and an upper wall having an upper surface oriented to the top of the vehicle and the front wall has the ventilation hole.

According to the aspect, the ventilation hole is open in the direction in which the intake space extends in the front-rear direction of the vehicle, and thus high-pressure water directed toward the intake space from the ventilation hole is likely to have a linear trajectory. Even when the ventilation hole is formed as described above, the momentum of the infiltrating high-pressure water can be further dampened and water infiltration into the outside air introduction duct can be further suppressed since the outside rib and the inside rib are disposed in the intake space.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinafter, a front portion structure 10 as an embodiment of a vehicle front portion structure will be described with reference to FIGS. 1 to 5. Arrows representing the front-rear direction, the width direction, and the up-down direction of a vehicle 90 equipped with the front portion structure 10 are appropriately shown in FIGS. 1 to 5.

Figure 1:
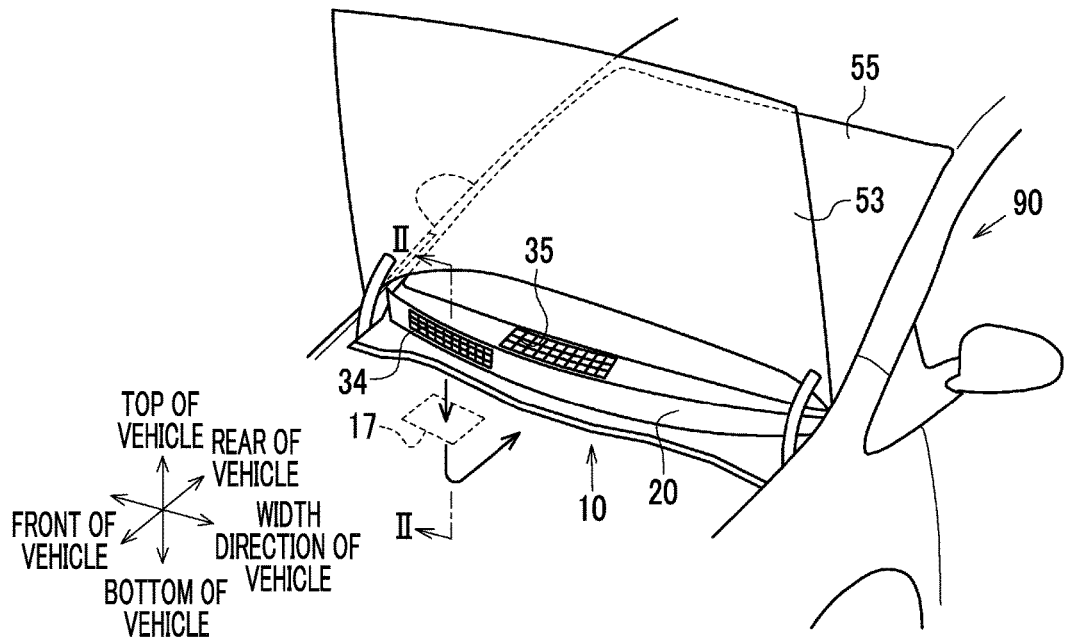
FIG. 1 is a perspective view illustrating a part of a vehicle adopting an embodiment of a vehicle front portion structure.

As illustrated in FIG. 1, the front portion structure 10 is provided with a cowl louver 20 and the cowl louver 20 is exposed to the upper surface of the vehicle 90. The cowl louver 20 is connected to the front end edge of a windshield 55 of the vehicle 90. The cowl louver 20 is molded with a resin. A front surface ventilation hole 34 and an upper surface ventilation hole 35 for introducing outside air are open in the cowl louver 20. The openings of the front surface ventilation hole 34 and the upper surface ventilation hole 35 are divided in a grid shape.

The front portion structure 10 is also provided with an outside air introduction duct 17 that introduces the outside air introduced from the front surface ventilation hole 34 and the upper surface ventilation hole 35 in the cowl louver 20 into the cabin of the vehicle 90. The outside air introduction duct 17 is disposed on the passenger seat side of the vehicle (right front seat side of the vehicle 90).

Figure 2:
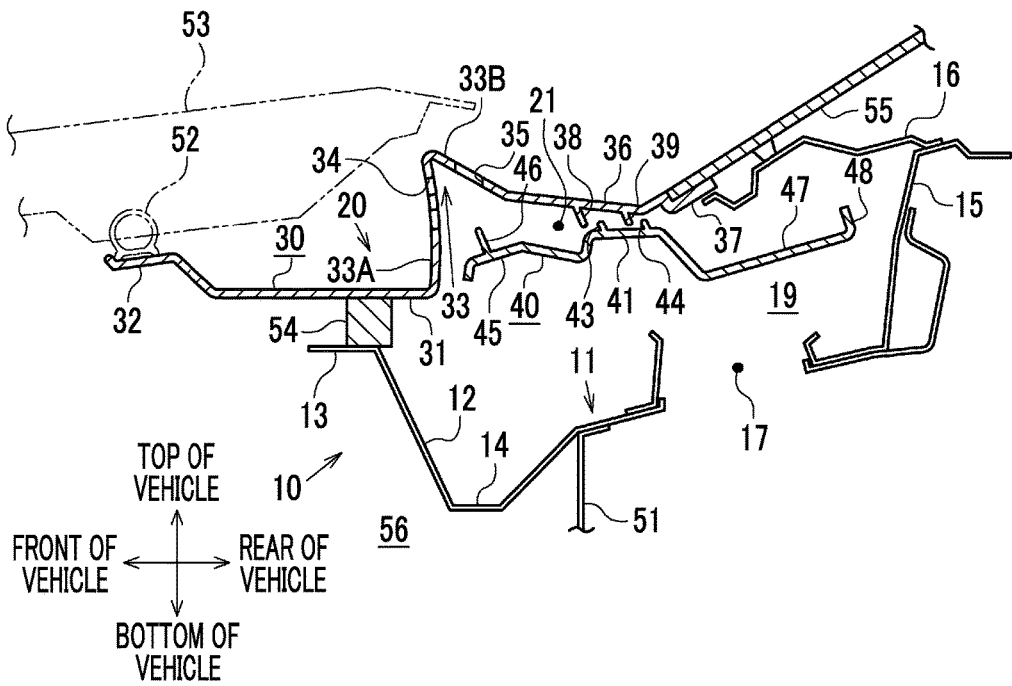
FIG. 2 is a cross-sectional view illustrating a cross-sectional structure taken along line II-II of FIG. 1.

As illustrated in FIG. 2, the upper portion of a cowl 11 is covered by the cowl louver 20 in the front portion structure 10. The cowl 11 is connected to a dash panel 51, which is a partition wall of an engine compartment 56 that is on the rear side of the vehicle.

A cowl front 12, a cowl outer 16, and a cowl inner 15 constitute the cowl 11. The cowl front 12 is connected to the dash panel 51 and is positioned in the front of the vehicle. The cowl outer 16 supports the windshield 55. The cowl inner 15 connects the cowl front 12 and the cowl outer 16 to each other. The outside air introduction duct 17 is formed as an opening that passes through the cowl inner 15 and the cowl front 12 in the up-down direction of the vehicle. The cowl front 12 is provided with a support portion 13 that supports the cowl louver 20 from the lower side of the vehicle. In the cowl front 12, a recessed portion 14 that is recessed toward the bottom of the vehicle is disposed between the outside air introduction duct 17 and the support portion 13.

Figure 3:
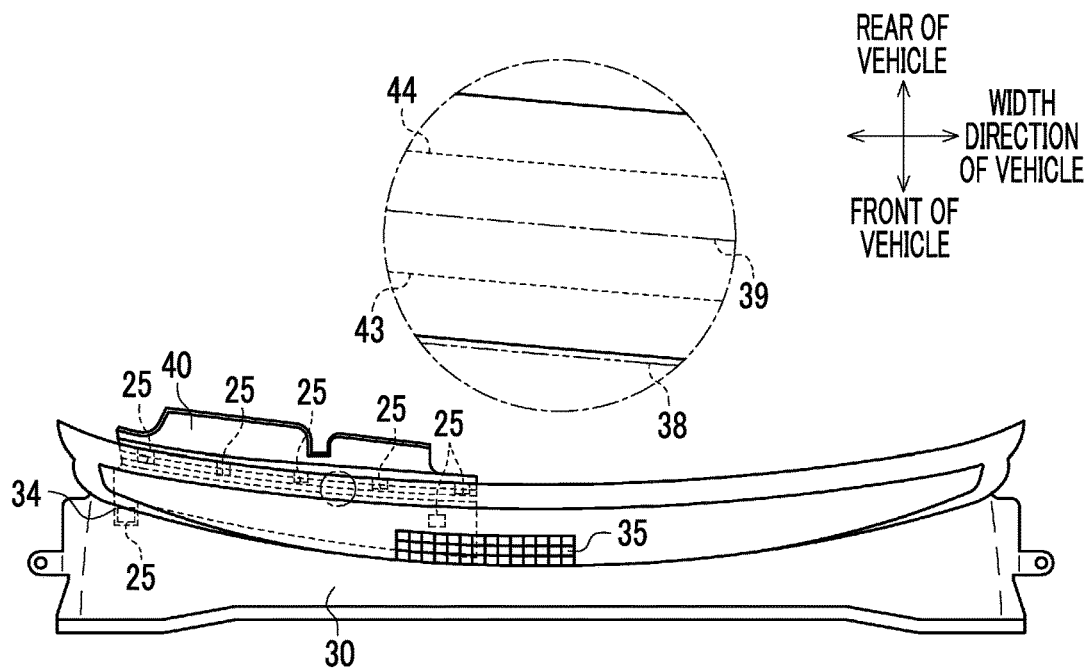
FIG. 3 is a plan view illustrating a cowl louver of the vehicle front portion structure according to the embodiment.

As illustrated in FIGS. 2 and 3, an outer plate portion 30 and an inner plate portion 40 constitute the cowl louver 20. The outer plate portion 30 is formed in a plate shape and extends in the width direction of the vehicle.

The outer plate portion 30 is provided with a fixed portion 31 that is supported by the support portion 13 of the cowl front 12. A seal member 54 is interposed between the support portion 13 and the fixed portion 31. A seal attachment portion 32 is disposed at the front end of the outer plate portion 30, and a hood seal 52 is attached to the seal attachment portion 32. The rear end of the seal attachment portion 32 is connected to the front end of the fixed portion 31.

In the outer plate portion 30, a ridge portion 33 that is raised to the top of the vehicle is disposed behind the fixed portion 31. The ridge portion 33 is provided with a front wall 33A extending upward from the rear end of the fixed portion 31 and an upper wall 33B extending to the rear side of the vehicle from the upper end of the front wall 33A. The upper wall 33B is inclined such that its position becomes closer to the bottom of the vehicle as its position becomes closer to the rear side of the vehicle. The front surface ventilation hole 34 is open in the front wall 33A. The upper surface ventilation hole 35 is open in the upper wall 33B.

A windshield support portion 37 that supports the windshield 55 is disposed at the rear end of the outer plate portion 30. An inside plate attachment portion 36 is disposed between the ridge portion 33 and the windshield support portion 37, and the inner plate portion 40 is attached to the inside plate attachment portion 36. The inside plate attachment portion 36 has a first outside rib 38 and a second outside rib 39 that protrude toward the bottom of the vehicle. The first outside rib 38 and the second outside rib 39 extend in the width direction of the vehicle. The inside plate attachment portion 36 also has an outside projecting portion that protrudes downward. The outside projecting portion is formed in a cube shape.

A hood 53 that covers the engine compartment 56 is disposed in the vehicle 90. In a state where the hood 53 is closed and the engine compartment 56 is covered by the hood 53, the hood seal 52 is deformed by being pressed by the hood 53. As a result, the gap between the seal attachment portion 32 of the cowl louver 20 and the hood 53 is blocked. In the state where the hood 53 is closed, the rear end of the hood 53 covers the front wall 33A of the ridge portion 33.

As illustrated in FIGS. 2 and 3, the inner plate portion 40 attached to the outer plate portion 30 is formed in a plate shape and extends in the width direction of the vehicle. The length of the inner plate portion 40 in the width direction of the vehicle is shorter than half of the length of the outer plate portion 30 in the width direction of the vehicle. The inner plate portion 40 is gradually inclined such that its position becomes closer to the bottom of the vehicle as its position becomes closer to the right-hand side of the vehicle 90 in the width direction of the vehicle. The inner plate portion 40 has a drainage portion in its inclined lower side end portion so that water is drained to the outside of the vehicle 90 in the width direction of the vehicle.

As illustrated in FIG. 2, a front portion 45 is disposed at the front end of the inner plate portion 40 and the front portion 45 is inclined such that its position becomes closer to the bottom of the vehicle as its position becomes closer to the front of the vehicle. A protruding piece 46 that protrudes toward the top of the vehicle is disposed on the front portion 45. The protruding piece 46 extends in the width direction of the vehicle.

Figure 4:
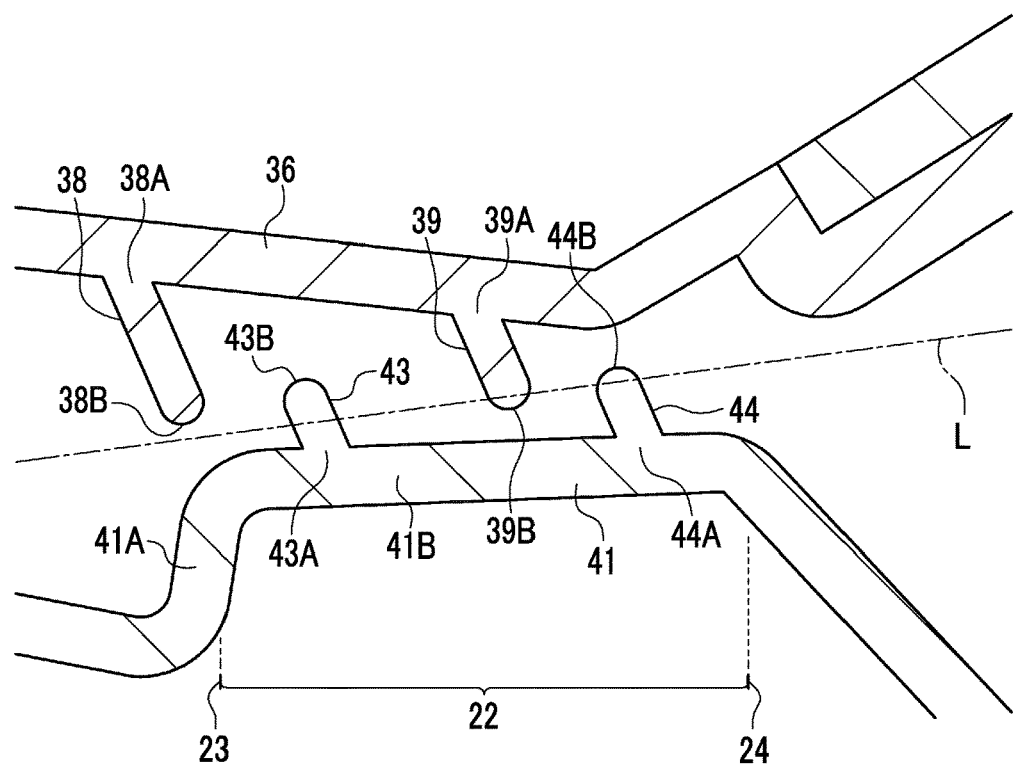
FIG. 4 is a partially enlarged view of FIG. 2.

In the inner plate portion 40, a bulging portion 41 that bulges toward the top of the vehicle is disposed behind the front portion 45 as illustrated in FIGS. 2 and 4. The bulging portion 41 is provided with a wall portion 41A extending toward the top of the vehicle from the rear end of the front portion 45 and a top portion 41B extending to the rear of the vehicle from the upper end of the wall portion 41A. The top portion 41B is the top surface of the bulging portion 41. A first inside rib 43 and a second inside rib 44 that protrude toward the top of the vehicle are disposed on the top portion 41B. The first inside rib 43 and the second inside rib 44 extend in the width direction of the vehicle. The top portion 41B has an inside projecting portion that protrudes upward. The inside projecting portion is formed in a cube shape.

A rear portion 47 that extends to the rear of the vehicle is connected to the rear end of the top portion 41B. A bent portion 48 that has a wall stretching toward the top of the vehicle is disposed at the end edge of the rear portion 47 that is on the rear side of the vehicle.

As illustrated in FIG. 2, the inner plate portion 40 is fixed to the surface of the outer plate portion 30 that is on the lower side of the vehicle. The inner plate portion 40 is disposed behind the front wall 33A of the ridge portion 33 of the outer plate portion 30. The bulging portion 41 and the rear portion 47 of the inner plate portion 40 are positioned above the outside air introduction duct 17. The bent portion 48 is positioned behind the outside air introduction duct 17.

The inner plate portion 40 is fixed by being welded to the outer plate portion 30. As illustrated in FIG. 3, the cowl louver 20 has a plurality of welded portions 25. The welded portions 25 are places where the inner plate portion 40 and the outer plate portion 30 are welded to each other. The welded portion 25 is formed in a columnar shape with the outside projecting portion that protrudes from the inside plate attachment portion 36 of the outer plate portion 30 and the inside projecting portion that protrudes from the top portion 41B of the inner plate portion 40 welded to each other. The outer plate portion 30 and the inner plate portion 40 are spaced apart from each other with the exception of the welded portions 25. The space that is sandwiched between the outer plate portion 30 and the inner plate portion 40 forms an intake space 21, which is a part of an introduction path 19.

The inner plate portion 40 has the bulging portion 41. Accordingly, the space between the outer plate portion 30 and the inner plate portion 40 becomes narrow on the side of the introduction path 19 that is provided downstream of the wall portion 41A of the bulging portion 41 as illustrated in FIG. 4. In other words, the intake space 21 is constricted. A constricted portion 22, where the intake space 21 is constricted, is formed in the cowl louver 20 as described above. Accordingly, the range in which the intake space 21 is constricted is from an upstream end 23 of the constricted portion 22 to a downstream end 24 of the constricted portion 22. The upstream end 23 is the side that is provided downstream of the upper end of the wall portion 41A of the bulging portion 41. The downstream end 24 is the side that is provided downstream of the rear end of the top portion 41B of the bulging portion 41. The intake space 21 expands on the side that is provided downstream of the downstream end 24.

As illustrated in FIG. 3, the side of the upper surface ventilation hole 35 that is close to the outside air introduction duct 17 is covered by the inner plate portion 40. As illustrated in FIGS. 2 and 4, the inner plate portion 40 is attached below the outer plate portion 30 in the cowl louver 20, and thus the first outside rib 38 and the second outside rib 39 of the outer plate portion 30 protrude toward the inner plate portion 40. In addition, the first inside rib 43, the second inside rib 44, and the protruding piece 46 of the inner plate portion 40 protrude toward the outer plate portion 30. In other words, the first outside rib 38, the second outside rib 39, the first inside rib 43, the second inside rib 44, and the protruding piece 46 are disposed in the intake space 21 between the outer plate portion 30 and the inner plate portion 40.

The first outside rib 38, the first inside rib 43, the second outside rib 39, and the second inside rib 44 are disposed in order and side by side from the front of the vehicle toward the rear of the vehicle. In other words, the first outside rib 38 and the second outside rib 39 protruding from the outer plate portion 30 and the first inside rib 43 and the second inside rib 44 protruding from the inner plate portion 40 are alternately disposed. The first outside rib 38 is disposed on the most upstream side and the first outside rib 38 is oriented to the boundary between the wall portion 41A and the top portion 41B of the bulging portion 41, that is, the end portion of the top portion 41B that is on the front side of the vehicle.

The first outside rib 38 and the second outside rib 39 extend toward the rear of the vehicle. Specifically, the first outside rib 38 is inclined such that a tip 38B is closer to the rear side of the vehicle than a base end 38A. The second outside rib 39 is inclined such that a tip 39B is closer to the rear side of the vehicle than a base end 39A.

The first inside rib 43 and the second inside rib 44 extend toward the front of the vehicle. Specifically, the first inside rib 43 is inclined such that a base end 43A is closer to the rear side of the vehicle than a tip 43B. The second inside rib 44 is inclined such that a base end 44A is closer to the rear side of the vehicle than a tip 44B.

In other words, each of the ribs 38, 39, 43, 44 is inclined such that its part on the lower side of the vehicle is closer to the rear of the vehicle than its part on the upper side of the vehicle. The protruding piece 46 extends toward the front of the vehicle as well. The inclination angles of the ribs 38, 39, 43, 44 and the protruding piece 46 are equal to one another.

The tip 38B of the first outside rib 38 and the tip 39B of the second outside rib 39 are spaced apart from the top portion 41B of the bulging portion 41. The tip 43B of the first inside rib 43 and the tip 44B of the second inside rib 44 are spaced apart from the inside plate attachment portion 36. The respective tips 38B, 39B, 43B, 44B of the ribs are positioned between the upstream end 23 and the downstream end 24 of the constricted portion 22.

The tip 43B of the first inside rib 43 is closer to the top of the vehicle than the tip 38B of the first outside rib 38. The tip 39B of the second outside rib 39 is closer to the bottom of the vehicle than the tip 43B of the first inside rib 43. The tip 44B of the second inside rib 44 is closer to the top of the vehicle than the tip 39B of the second outside rib 39.

The straight line L that is illustrated in FIG. 4 is a virtual straight line connecting the upstream end 23 and the downstream end 24 of the constricted portion 22 to each other. The straight line L is a virtual straight line passing through the end portion of the intake space 21 that is on the front side of the vehicle and the end portion of the intake space 21 that is on the rear side of the vehicle. The straight line L that is exemplified in FIG. 4 passes through the first inside rib 43, the second outside rib 39, and the second inside rib 44. In the cowl louver 20, the first outside rib 38, the first inside rib 43, the second outside rib 39, and the second inside rib 44 are disposed such that a virtual straight line connecting the upstream end 23 and the downstream end 24 of the constricted portion 22 to each other and not limited to the straight line L exemplified herein passes through one or more of the ribs.

As illustrated in FIG. 3, the first outside rib 38 and the second outside rib 39 extending in the width direction of the vehicle are continuously disposed along the stretching direction of the outer plate portion 30. The first inside rib 43 and the second inside rib 44 extending in the width direction of the vehicle are continuously disposed along the stretching direction of the inner plate portion 40 and are disposed over the entire width direction of the vehicle on the inner plate portion 40. The ribs 38, 39, 43, 44 are disposed such that their extension directions are parallel to one another.

In the front portion structure 10, a labyrinth structure is disposed in the intake space 21 by the ribs 38, 39, 43, 44, the outer plate portion 30, and the inner plate portion 40. The action and effect of the front portion structure 10 according to the embodiment will be described below.

As illustrated in FIG. 2, the inner plate portion 40 of the cowl louver 20 is interposed between the outside air introduction duct 17 and the front and upper surface ventilation holes 34, 35. As a result, when water infiltrates from the front surface ventilation hole 34 and the upper surface ventilation hole 35, the water is obstructed by the inner plate portion 40. Accordingly, direct water flow into the outside air introduction duct 17 is suppressed.

When water collides with the inner plate portion 40 and splashes toward the front of the vehicle, the water can be held by the protruding piece 46 disposed on the front portion 45. Accordingly, water infiltration into the outside air introduction duct 17 can be prevented.

In a case where water infiltrates into the intake space 21, which is a part of the introduction path 19, the water collides with at least one of the first outside rib 38, the second outside rib 39, the first inside rib 43, and the second inside rib 44. The ribs 38, 39, 43, 44 are disposed to form the labyrinth structure, and thus the momentum of the water directed toward the outside air introduction duct 17 in the intake space 21 can be dampened. Water infiltration into the outside air introduction duct 17 can be suppressed even when high-pressure water infiltrates into the intake space 21.

The ribs 38, 39, 43, 44 are alternately disposed, and thus the labyrinth structure is capable of having a complex shape. When the intake space 21 has a complex internal structure, not only water collides with the ribs but also the streams of the water turned by colliding with the ribs collide with each other to turn into mist, and thus the momentum of the water directed toward the outside air introduction duct 17 can be further dampened. The more complex the internal structure of the intake space 21, the more likely the collision between the streams of the water is to occur.

Figure 5:
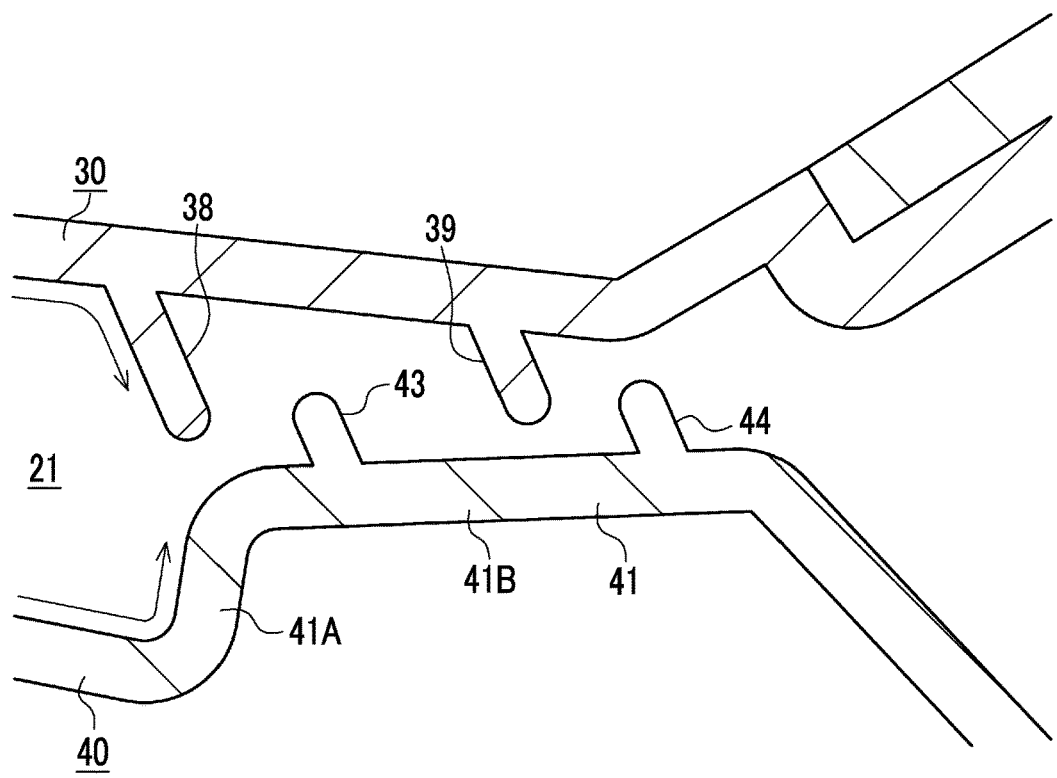
FIG. 5 is a partially enlarged view of FIG. 2 and is a diagram schematically illustrating how water flows.

The flow of water infiltrating into the intake space 21 is schematically illustrated in FIG. 5. The first outside rib 38 is disposed such that it is oriented to the boundary between the wall portion 41A and the top portion 41B of the bulging portion 41. Accordingly, the water that flows along the outer plate portion 30 in the intake space 21 in the event of the water infiltration into the intake space 21 collides with the first outside rib 38 and is turned toward the inner plate portion 40. The water that flows along the inner plate portion 40 in the intake space 21 collides with the wall portion 41A of the bulging portion 41 and is turned toward the outer plate portion 30. Since the above-described structure that prevents water infiltration is disposed on the side of the introduction path 19 that is provided upstream of the labyrinth structure, the possibility of water flow to the side that is provided downstream of the labyrinth structure can be ruled out. Even when water flows to the downstream side of the introduction path 19, the amount of the water that reaches the downstream side can be further reduced by the action of the first outside rib 38 and the wall portion 41A, and thus water infiltration into the outside air introduction duct 17 can be further suppressed based on the synergy with the damping effect of the labyrinth structure.

Each of the ribs 38, 39, 43, 44 is inclined such that its part on the lower side of the vehicle is closer to the rear of the vehicle than its part on the upper side of the vehicle. Accordingly, water can be held with its momentum dampened and water flow to the downstream side of the introduction path 19 can be further suppressed.

The respective tips 38B, 39B, 43B, 44B of the ribs are positioned between the upstream end 23 and the downstream end 24 of the constricted portion 22. Accordingly, the protrusion lengths of the ribs 38, 39, 43, 44 can be reduced. More rigidity can be ensured for the cowl louver 20 than in a case where the ribs have a long protrusion length and the momentum of the water directed toward the outside air introduction duct 17 can be dampened at the same time.

The bent portion 48 is disposed at the rear end of the inner plate portion 40, and thus a weir is formed at the rear end of the inner plate portion 40. As a result, the water that has a momentum dampened by the labyrinth structure can be held before the water infiltrates into the outside air introduction duct 17 when the water passes through the constricted portion 22 after infiltrating from the front surface ventilation hole 34 and the upper surface ventilation hole 35. The water can be drained to the outside of the vehicle 90 in the width direction of the vehicle after being held since the inner plate portion 40 is inclined in the width direction of the vehicle.

Water is likely to infiltrate via the front surface ventilation hole 34 since the front surface ventilation hole 34 is formed in the cowl louver 20. However, when high-pressure water is sprayed toward the front surface ventilation hole 34, the momentum of the water can be dampened by the labyrinth structure, and thus infiltration of the high-pressure water into the outside air introduction duct 17 can be further suppressed.

In the front portion structure 10, the inner plate portion 40 is interposed between the front surface ventilation hole 34 and the outside air introduction duct 17. The upper surface ventilation hole 35, which is less likely to be subjected to water infiltration than the front surface ventilation hole 34, is not entirely obstructed by the inner plate portion 40. Accordingly, a sufficient amount of air can be directly taken into the outside air introduction duct 17 via the front surface ventilation hole 34 and the upper surface ventilation hole 35 and water infiltration into the outside air introduction duct 17 can be further suppressed at the same time.

In the front portion structure 10, the labyrinth structure that is formed by the ribs 38, 39 protruding from the outer plate portion 30 and the ribs 43, 44 protruding from the inner plate portion 40 are capable of suppressing water infiltration into the outside air introduction duct 17 by dampening the momentum of water. In other words, water infiltration into the outside air introduction duct 17 can be suppressed without an additional seal member or the like being disposed between the outer plate portion 30 and the inner plate portion 40.

The embodiment can also be implemented after being appropriately changed as follows.

In the embodiment, the front surface ventilation hole 34 and the upper surface ventilation hole 35 are formed in the cowl louver 20. Alternatively, the front surface ventilation hole 34 may be formed without the upper surface ventilation hole 35 being formed or the upper surface ventilation hole 35 may be formed without the front surface ventilation hole 34 being formed.

The inner plate portion 40 may further extend in the width direction of the vehicle. For example, the inner plate portion 40 can be disposed such that it obstructs the entire upper surface ventilation hole 35.

In the embodiment, the bent portion 48 is disposed at the end edge of the rear portion 47 of the inner plate portion 40 that is on the rear side of the vehicle. However, configurations for holding water with the rear portion 47 are not limited thereto. For example, water reaching the rear portion 47 can be held by a recessed groove recessed to the lower side of the vehicle being formed in the rear portion 47 as an alternative to the bent portion 48.

The inclination angle of the first outside rib 38, the second outside rib 39, the first inside rib 43, and the second inside rib 44 is not limited to that according to the embodiment. For example, the inclination angle of the ribs 39, 43, 44 can be set in accordance with the inclination angle of the first outside rib 38 after the inclination angle of the first outside rib 38 is changed such that the first outside rib 38 is oriented to the side that is ahead of or behind the boundary between the wall portion 41A and the top portion 41B of the bulging portion 41. In addition, the ribs 38, 39, 43, 44 may extend in, for example, the vertical direction. The ribs may have four different inclination angles as well. Furthermore, each of the ribs 38, 39, 43, 44 can be inclined such that its part on the lower side of the vehicle is closer to the front of the vehicle than its part on the upper side of the vehicle.

In the embodiment, the first outside rib 38 and the second outside rib 39 protruding from the outer plate portion 30 and the first inside rib 43 and the second inside rib 44 protruding from the inner plate portion 40 are alternately disposed. However, the first and second outside ribs 38, 39 and the first and second inside ribs 43, 44 do not necessarily have to be alternately disposed.

In the embodiment, the base end 38A of the first outside rib 38 is set at the upstream end 23 of the constricted portion 22 such that the first outside rib 38 is oriented to the boundary between the wall portion 41A and the top portion 41B of the bulging portion 41. The base end 38A of the first outside rib 38 can be moved to the front side of the vehicle or the rear side of the vehicle as well.

In the constricted portion 22, the outer plate portion 30 may be provided with a bulging portion bulging toward the inner plate portion 40. In this case, the first inside rib 43 can be disposed such that it is oriented to the end portion of the top surface of the bulging portion of the outer plate portion 30 that is on the front side of the vehicle.

The inner plate portion 40 may not be provided with the bulging portion 41. The space between the outer plate portion 30 and the inner plate portion 40 is increasingly constricted toward the rear of the vehicle insofar as the inner plate portion 40 is fixed such that the inner plate portion 40 becomes closer to the outer plate portion 30 as the inner plate portion 40 becomes closer to the rear side of the vehicle.

The constricted portion 22 is optional. For example, the inner plate portion 40 can be fixed, with the configuration of the bulging portion 41 omitted, such that the inner plate portion 40 is substantially parallel to the outer plate portion 30.

In the embodiment, the ribs 38, 39, 43, 44 are disposed such that the first outside rib 38 and the second outside rib 39 are spaced apart from the inner plate portion 40 and the first inside rib 43 and the second inside rib 44 are spaced apart from the outer plate portion 30. The gaps between the ribs and the outer plate portion 30 or the inner plate portion 40 may be eliminated by the dimensions of the ribs in the up-down direction of the vehicle becoming equal to the dimension of the intake space 21 in the up-down direction of the vehicle.

Figure 6:
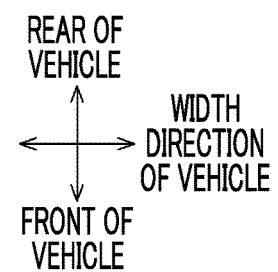
FIG. 6 is a plan view illustrating a modification example of the vehicle front portion structure.
Figure 6:
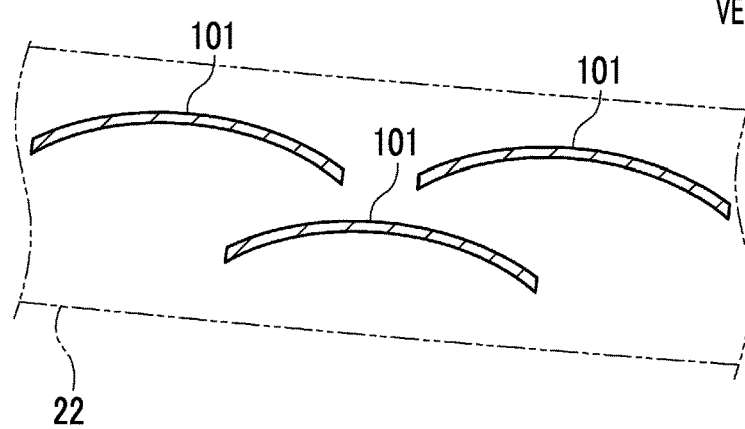

For example, a plurality of bow-shaped ribs 101 extending in the up-down direction of the vehicle is disposed at intervals in the width direction of the vehicle such that the arc of the bow shape is positioned in the rear of the vehicle as illustrated in FIG. 6. By gaps being formed between the ribs 101 arranged in the width direction of the vehicle, air passing through the front surface ventilation hole 34 and the upper surface ventilation hole 35 is capable of passing through the gaps between the ribs 101 even in a case where the height of the ribs 101 is equal to the height of the intake space 21. The height of the ribs may be equal to the height of the intake space 21 insofar as the gaps allowing air to flow to the downstream side of the introduction path 19 are formed as described above.

In the configuration that is exemplified in FIG. 6, a labyrinth structure can be formed by the ribs 101 being disposed side by side in the width direction of the vehicle and the front-rear direction of the vehicle. As a result, the momentum of water infiltrating into the intake space 21 can be further dampened. The dimension of the ribs 101 in the up-down direction of the vehicle can be shorter than the dimension of the intake space 21 in the up-down direction of the vehicle as is the case with the ribs 38, 39, 43, 44 according to the embodiment. The shape of the ribs 101 is not limited to the bow shape. The shape of a mountain can be adopted instead.

In the embodiment, four ribs are disposed in the intake space 21. However, the number may be three or less or may be five or more as well.

The ribs exemplified in the embodiment stretch in the form of a straight line in the width direction of the vehicle. The ribs 38, 39, 43, 44 may also extend in a wave shape in the width direction of the vehicle.

In the embodiment, the outside air introduction duct 17 passes through the cowl inner 15 and the cowl front 12 in the up-down direction of the vehicle. Alternatively, the outside air introduction duct 17 may be disposed such that the opening of the outside air introduction duct 17 is directed toward the front of the vehicle.

In a vehicle in which its passenger seat is on the left-hand side of its front portion, the outside air introduction duct 17 that is disposed on the passenger seat side of the vehicle is disposed on the left-hand side of the front portion. In this case, the inner plate portion 40 may be attached to the left side of the outer plate portion 30 in the width direction of the vehicle. The same effect as in the embodiment can be achieved insofar as the inner plate portion 40 is attached to the outside air introduction duct 17 side.

What is claimed is:

1. A vehicle front portion structure comprising:
   a cowl having an outside air introduction duct introducing air into a cabin of a vehicle; and
   a cowl louver exposed to a top of the vehicle and covering the cowl from an upper side of the vehicle, the cowl louver having a ventilation hole communicating with an outside of the vehicle, wherein:
   the cowl louver includes an outer plate portion extending in a width direction of the vehicle and an inner plate portion disposed below the outer plate portion and covering the outside air introduction duct from the upper side of the vehicle;
   an intake space formed between the outer plate portion and the inner plate portion forms a part of an outside air introduction path allowing the ventilation hole and the outside air introduction duct to communicate with each other;
   an outside rib protruding from the outer plate portion toward the inner plate portion and extending in the width direction of the vehicle and an inside rib protruding from the inner plate portion toward the outer plate portion and extending in the width direction of the vehicle are disposed in the intake space; and
   a virtual straight line passing through a front end portion of the intake space on a front side of the vehicle and a rear end portion of the intake space on a rear side of the vehicle intersects with at least one of the outside rib and the inside rib.

2. The vehicle front portion structure according to claim 1, wherein:
   a tip of the outside rib is spaced apart from the inner plate portion; and
   a tip of the inside rib is spaced apart from the outer plate portion.

3. The vehicle front portion structure according to claim 1, wherein:
   the outside rib includes at least a first outside rib and a second outside rib disposed behind the first outside rib in a vehicle front-rear direction;
   the inside rib includes at least a first inside rib and a second inside rib disposed behind the first inside rib in the vehicle front-rear direction; and
   the virtual straight line intersects with at least two of the first outside rib, the second outside rib, the first inside rib, and the second inside rib.

4. The vehicle front portion structure according to claim 3, wherein:
   a tip of the first inside rib is closer to the top of the vehicle than a tip of the second outside rib; and
   a tip of the second outside rib is closer to a bottom of the vehicle than a tip of the first inside rib.

5. The vehicle front portion structure according to claim 1, wherein:
   the cowl louver is provided with a constricted portion where the intake space is constricted by the outer plate portion and the inner plate portion approaching each other; and
   a tip of the outside rib and a tip of the inside rib are positioned in the constricted portion.

6. The vehicle front portion structure according to claim 5, wherein:
   the inner plate portion has a bulging portion which bulges from the inner plate portion toward the outer plate portion and which is disposed in the constricted portion; and
   the outside rib protrudes from the outer plate portion toward an end portion of a top surface of the bulging portion on the front side of the vehicle.

7. The vehicle front portion structure according to claim 1, wherein a plurality of the outside ribs and a plurality of the inside ribs are disposed side by side in a front-rear direction of the vehicle and the outside ribs and the inside ribs are alternately disposed.

8. The vehicle front portion structure according to claim 1, wherein:
   the outside rib extends toward a rear of the vehicle;
   the inside rib extends toward a front of the vehicle; and
   the outside rib and the inside rib are inclined such that a part of each of the outside rib and the inside rib on a lower side of the vehicle is closer to the rear of the vehicle than a part of each of the outside rib and the inside rib on the upper side of the vehicle.

9. The vehicle front portion structure according to claim 1, wherein an end edge of the inner plate portion on the rear side of the vehicle is bent toward the upper side of the vehicle.

10. The vehicle front portion structure according to claim 1, wherein:
    the cowl louver is provided with a ridge portion raised to the top of the vehicle; and
    the ridge portion has a front wall having a front surface oriented to a front of the vehicle and an upper wall having an upper surface oriented to the top of the vehicle and the front wall has the ventilation hole.

* * * * *